United States Patent [19]
Wood

[11] Patent Number: 5,793,311
[45] Date of Patent: Aug. 11, 1998

[54] LOW PROFILE KEYBOARD

[75] Inventor: Anthony B. Wood, Dallas, Tex.

[73] Assignee: Texas Instruments Incorporated, Dallas, Tex.

[21] Appl. No.: 774,829

[22] Filed: Dec. 27, 1996

[51] Int. Cl.$^6$ .......................... H03K 17/94; H03M 11/00
[52] U.S. Cl. .................. 341/22; 341/34; 345/168; 200/181
[58] Field of Search .................... 341/23, 34; 200/5 A, 200/5 R; 310/328, 329; 345/168, 169

[56] References Cited

U.S. PATENT DOCUMENTS 3,935,485  1/1976  Yoshida et al. ..................... 341/34
4,507,651  3/1985  Boll et al. .......................... 341/32

*Primary Examiner*—Jeffery Hofsass
*Assistant Examiner*—Timothy Edwards, Jr.
*Attorney, Agent, or Firm*—Ronald O. Neerings; James C. Kesterson; Richard L. Donaldson

[57] ABSTRACT

A keyboard (54) includes a plurality of keys (30). As during a keystroke, the sidewall (34) of the keys (30) deform, causing a change in an electrical property for that key. If the sidewalls (34) are formed of a piezoelectric material, a voltage will be generated. The keys are scanned by a keyboard controller (60) to determine whether a key is being pressed or released.

26 Claims, 3 Drawing Sheets

LOW PROFILE KEYBOARD

BACKGROUND OF THE INVENTION

1. Technical Field

This invention relates in general to keyboards and, more particularly, to a low profile keyboard for use in a notebook computer or other electronic device.

2. Description of the Related Art

Since the proliferation of the personal computer as a personal and business tool, portable computers have been in high demand. Portable computer manufacturers are continually refining the portable computers to have a greater number of features while reducing the size and weight of the units.

Very low weight portable computers are referred to as "notebook" computers. At one time, notebook computers were stripped of many features in order to reduce weight and size; however current day notebook computers are full-featured. Weight and size are among the most important factors in selecting a notebook computer. Since a notebook computer is meant to be used in many different locations, the ease with which it can be carried is often determinative of its value.

Many factors contribute to the size and weight of a notebook computer. Improved technology has allowed several components to be reduced in size. For example, hard drives and motherboards can be made much smaller than those of a few years ago. Other components cannot simply be made smaller simply by further miniaturization, because their functionality is dependent upon their size. A good example of such a component is the keyboard, which needs to meet certain physical parameters in order to be comfortable to use.

Keyboards are the user's prime interface for entering information and commands into a computer. It is therefore important to users that the keyboard allow typing at a high speed. A primary consideration in touch typing it the length of the keystroke. The keyboards used with desktop computers is on the order of five millimeters.

The keyboard used in a notebook computer, on the other hand, typically has a keystroke on the order of three to four millimeters. Accordingly, many portable computer designers provide a port for a full-sized keyboard, either as a port on the notebook computer or as a port on a docking station. Despite its reduced keystroke, the notebook keyboards typically have a height of approximately seven millimeters, which significantly adds to the overall thickness of the device.

Therefore, a need has arisen in the industry for a portable computer with a thinner keyboard without sacrificing the functionality of the keyboard.

SUMMARY OF THE INVENTION

The present invention provides an electronic device with a keyboard whose keys may provide a full keystroke during operation and assume a compressed state during storage. In the electronic device, processing circuitry is coupled to a keyboard having a plurality of keys. Each key includes a keycap and a material layer coupled to said keycap. The material layer exhibits changes in an electrical property in response to being deformed as the keycap is depressed. Controller circuitry for detects a change in the electrical property to identify a keystroke.

The present invention provides significant advantages over the prior art. First, by placing the keys in a depressed position while the electronic device is not being used, the keyboard can attain a low profile storage position, without damage to the electrical or mechanical components needed for operation of the keys. Second, the keys can be made from light weight materials, while eliminating many of the components used in conventional keys to reduce cost and weight.

BRIEF DESCRIPTION OF THE DRAWINGS

For a more complete understanding of the present invention, and the advantages thereof, reference is now made to the following descriptions taken in conjunction with the accompanying drawings, in which:

FIG. 5b illustrates a perspective view of the sidewalls formed from the pattern of FIG. 5a;

DETAILED DESCRIPTION OF THE PREFERRED EMBODIMENT

The present invention is best understood in relation to FIGS. 1–8 of the drawings, like numerals being used for like elements of the various drawings.

Figure 1:
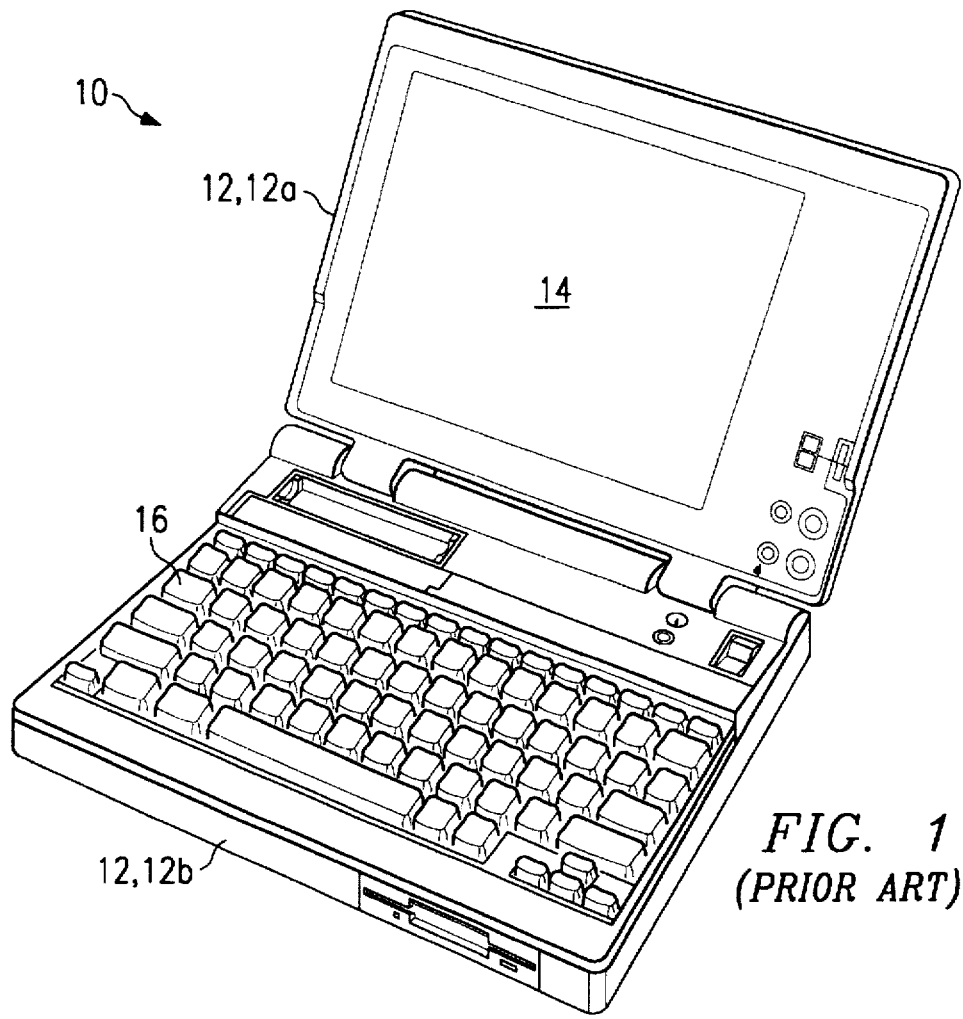
FIG. 1 illustrates a notebook computer.

With reference to FIG. 1, there is shown a prior art portable computer 10 of the type commonly referred to as a notebook computer, or laptop computer. Computer 10 includes a housing 12 which is a clamshell type enclosure which includes a top housing 12a and a bottom housing 12b. The top housing 12a includes a screen 14, and the bottom housing 12b has a keyboard 16. The bottom housing also contains the processing electronics, such as the central processing unit (CPU), main memory, cache memory, mass storage memory (such as a hard drive and/or CD-ROM), video/graphics controller, input/output circuitry, BIOS (basic input output system), and sound controller.

The two housings are connected along one edge with a hinge for pivotal movement relative to each other to expose the keyboard and display for use from the closed position. In order to reduce the overall thickness of the combined housings it is desirable to reduce the thickness of the keyboard and its associated housing.

Figure 2:
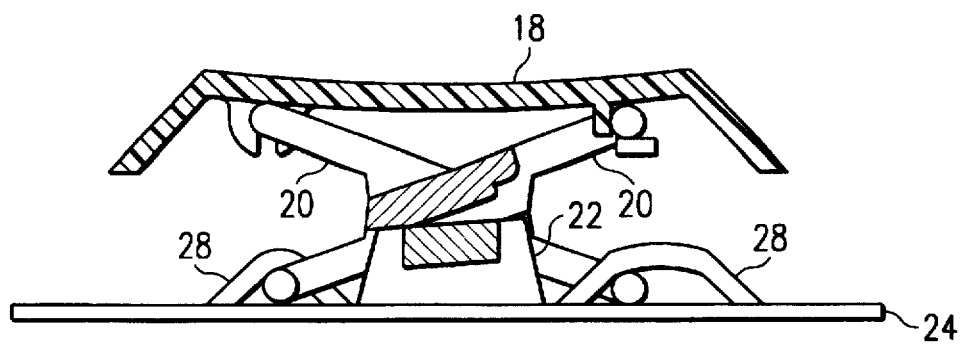
FIG. 2 illustrates a prior art key mechanism.

An example of a prior art keyboard key is illustrated in cross section in FIG. 2. This type of key comprises, a keycap 18, a guide mechanism 20, a flexible dome 22, and a base 24. The keycap 18 is typically formed of a resin with an alphanumeric character stamped or formed on the top, and includes two pairs of engaging members or grooves to secure it to the guide mechanism 20. The guide mechanism is a scissor mechanism as described U.S. Pat. Nos. 5,280, 147, 5,278,372 and 5,463,195, all of which are incorporated by reference herein. The guide mechanism 20 presses a rubber spring or flexible dome 22 which has a moveable electrode 26 which makes contact with electrical traces on the base 24 when the key is depressed. The base 24 includes a means for retaining the guide mechanism such as the eyelets 28 as shown. Typically, one of the eyelets will hold one guide mechanism arm stationary, as shown on the left, and another eyelet will slideably retain a second guide mechanism arm, as shown on the right of FIG. 2.

The keyboard key shown in FIG. 2 requires an overall height of approximately seven millimeters to obtain a stroke of three millimeters. The height of the keys, therefore adds a significant amount of height to the bottom housing 12b.

The improvement over the prior art for the instant patent is primarily the ability to reduce the storage height of the key by the amount of the key travel. In the prior art, if the key were to be stored in the depressed mode, the rubber spring or flexible dome would be compressed while in the storage mode, resulting in a damaged spring or dome. If the keys are fully depressed, the electrodes on the keys may be damaged. Also, it is more difficult to compress all the keys simultaneously when the flexible domes are in place. Furthermore, the key mechanism requires multiple pieces which contribute to cost and weight.

Figure 3:
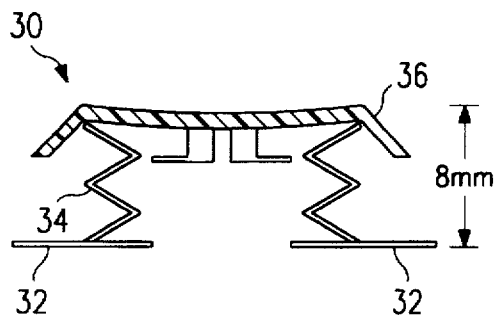
FIG. 3 illustrates cross-sectional side view of a preferred embodiment of a key in a normal position.

FIG. 3 illustrates a cross-sectional view of a key 30 which overcomes many of the aforementioned failings of the prior art. A base plate 32 of the keyboard is attached to the lower ends of side support members 34. The side support members 34 are folded into an accordion shape. The upper ends of side support members 34 are coupled to a keycap 36.

Side members 34 are formed, at least in part, of a material which has a change in electrical properties responsive when it is placed under a mechanical stress. One type of material which has this quality is a piezoelectric material, which produces a voltage when a mechanical stress is applied to the material. A suitable plastic piezoelectric material is polyvinylidene fluoride (PVDF). Other suitable materials are those which produce detectable changes to other electrical properties in response to a mechanical stress, for example, by changing their resistivity.

In operation, the user presses the keys of the keyboard as normal. As the key 30 is depressed, the side members 34 have a change in electrical property, such as developing a voltage, in the case of a piezoelectric side member 34. This change is detected by a keyboard controller (see FIG. 6), which can identify the key being pressed as the voltage, or other electrical property, develops. Similarly, as the key is released, a voltage of the opposite polarity is developed by the sidewall 34. This voltage is also detectable by the keyboard controller. In the preferred embodiment, the side members 34 not only generate a voltage for key detection, but also provide the spring to return the key 30 to a normal state after depression.

Figure 7:
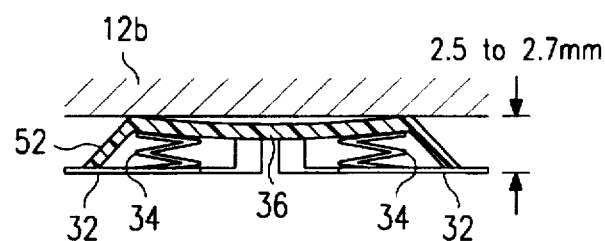
FIG. 7 illustrates a cross-sectional side view of a key in a storage position.
Figure 4:
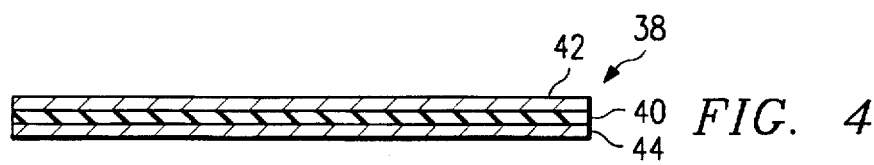
FIG. 4 illustrates a cross sectional side view of a material layer used to form the sidewalls of the keys of FIG. 3.

FIG. 4 illustrates a preferred embodiment of a material layer 38 for use in the side members 34. The material layer 38 includes an active material layer 40 (which is assumed to be a piezoelectric material, but can be any material which changes electrical properties in response to a mechanical stress) disposed between two substrate layers 42 and 44. The substrate layers can be a plastic, such as polypropylene. The substrate layers 42 and 44 should be lightweight and have sufficient elasticity to return to the desired shape after a keystroke, and after a prolonged period in a depressed condition, as shown in FIG. 7.

When the material shown in FIG. 4 is folded into the side members 34, the substrate layers 42 and 44 provide the spring mechanism for returning the key to a normal position after a keystroke. When depressed, the inner substrate will be compressed at the folds while the outer substrate will be stretched. Accordingly, when released, the substrate layers spring to a normal position.

Figure 5A:
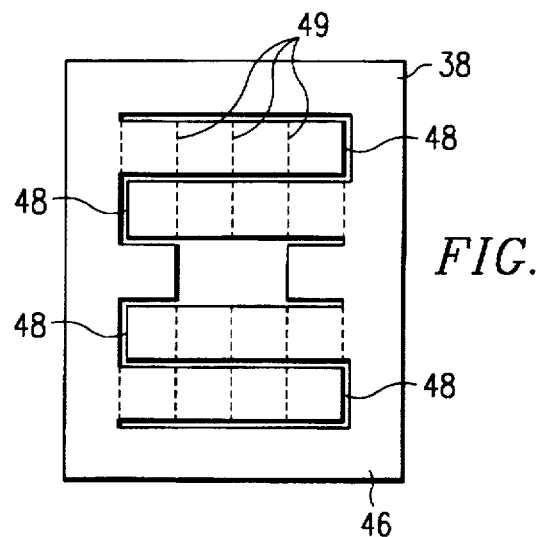
FIG. 5a illustrates a pattern for forming the sidewalls of the keys of FIG. 3.
Figure 5B:
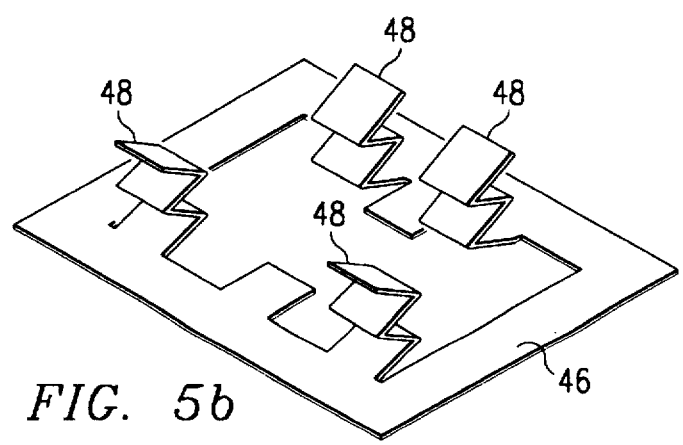

FIGS. 5a and 5b illustrate a pattern for cutting and folding the material layer 38 to form the side support members 34 for a key 30. The pattern shown in FIG. 5a defines a base layer 46 and supports arms 48. Fold marks 49 are shown on the support arms 48.

In FIG. 5b, the support arms 48 are folded in an accordion pattern away from the base layer 46 to provide a spring. The keycap 36 can be mounted on the support arms 48 to complete the key 30. Electrical connections are made to each side of the active material layer 40 for detection of the electrical properties of the material.

It should be noted that the structure shown in FIGS. 5a and 5b is one of a number of designs which could be used to implement the support members.

Figure 6:
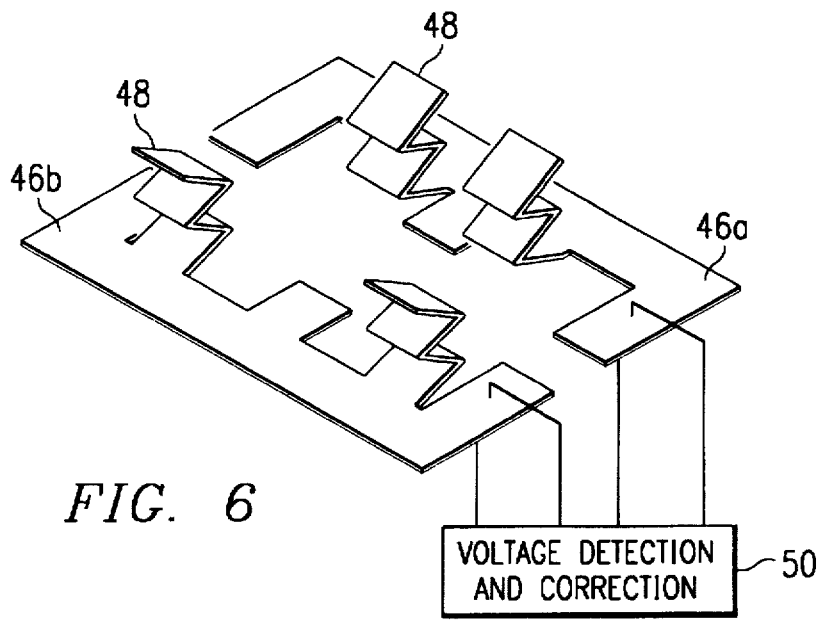
FIG. 6 illustrates a perspective view of an alternative embodiment of sidewalls having an off-center keystroke correction mechanism.

FIG. 6 illustrates an alternative embodiment wherein the base layer 46 is split into sections 46a and 46b, which are electrically isolated from one another. A voltage detector and response circuit 50 is coupled to keys 30 using this embodiment to detect situations where the pressure applied during a keystroke is off center. In this case, the voltage from one side of the support member 34 will be greater than the other, as one side of the key is pressed down more quickly than the other. The imbalance in voltage is detected by the voltage detector and response circuit 50, and a voltage is applied to the slower side of the support members 34 to stiffen the piezoelectric material on that side of the key 30 to balance the keystroke.

While FIG. 6 shows an embodiment where the imbalance is detected between two pairs of support arms 48, it would be possible for each support arm 48 to be individually monitored and corrected for a voltage imbalance during a keystroke.

FIG. 7 illustrates a key 30 in a storage position, where the top housing 12a is folded against the bottom housing 12b, pressing the keys 30 downward. Whereas the key 30 can have a height of approximately eight millimeters in the normal state (see FIG. 3), when fully depressed in a storage position, its height is in the range of 2.5–2.7 millimeters. To minimize the height due to the keycap, flexible skirts 52 can be employed, which bend outward against the base plate 32 when the key is depressed to its lowest position.

Because the keys 30 do not use flexible domes or electrodes, the keyboard can achieve a lower profile in the storage state and does not risk damage to the electrical or mechanical parts of the keys.

Figure 8:
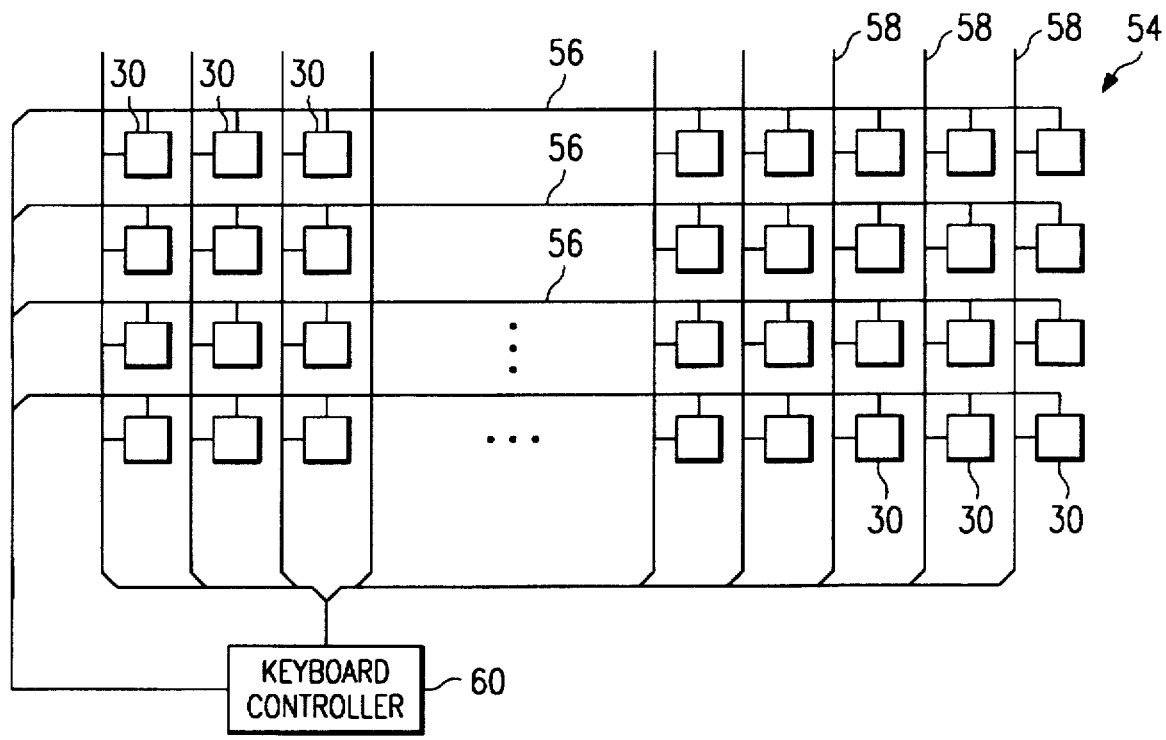
FIG. 8 illustrates a circuit diagram of a keyboard using the keys of FIG. 3.

FIG. 8 illustrates a keyboard circuit 54, using the keys 30 described hereinabove. A plurality of row lines 56 and column lines 58 are coupled to a keyboard controller 60. The piezoelectric material 40 in each key is coupled to unique pair of row and column lines. The keyboard controller 60 scan each row/column combination to determine whether there is a voltage. The polarity of the voltage will indicate whether the key is being pressed or released. This information may be passed to the computer, or to any processing circuit.

Alternatively, the keyboard controller 60 may be detecting other electrical properties if a material other than a piezoelectric material is used, such as a material which changes is resistance in response to a mechanical stress.

The present invention provides significant advantages over the prior art. First, by placing the keys in a depressed position while the electronic device is not being used, the keyboard can attain a low profile storage position, without damage to the electrical or mechanical components needed for operation of the keys. Second, the keys can be made from light weight materials, while eliminating many of the components used in conventional keys to reduce cost and weight.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

What is claimed is:

1. An electronic device comprising:
   processing circuitry; and
   a keyboard coupled to said processing circuitry, said keyboard comprising:
   a plurality of keys, each comprising:
      a keycap; and
      a piezoelectric material layer coupled to said keycap, said piezoelectric material forming one or more folded sidewalls attached to said keycap and exhibiting changes in an electrical property in response to being deformed as the keycap is depressed; and
   controller circuitry coupled to said keys for detecting a change in said electrical property to identify a keystroke.

2. The electronic device of claim 1 and further comprising circuitry for detecting an imbalance of voltages from said sidewalls of a key during a keystroke indicative of an off-center force applied to the key.

3. The electronic device of claim 1 wherein said piezoelectric material layer changes resistance in response to a mechanical stress.

4. The electronic device of claim 1 wherein said piezoelectric material layer is disposed between two plastic layers.

5. The electronic device of claim 1 wherein said piezoelectric material layer comprises a layer which changes resistance in response to a mechanical stress disposed between two plastic layers.

6. The electronic device of claim 1 wherein said controller circuitry comprises:
   a plurality of row lines;
   a plurality of column lines;
   said keys each coupled to a row line and a column line; and detection circuitry for scanning said row and column lines for detecting a change in electrical property.

7. An electronic device comprising:
   processing circuitry; and
   a keyboard coupled to said processing circuitry, said keyboard comprising:
   a plurality of keys, each comprising:
      a keycap; and
      a piezoelectric material layer coupled at said keycap, said piezoelectric material layer exhibiting changes in an electrical property in response to being deformed as the keycap is depressed; and
   controller circuitry coupled to said keys for detecting a change in said electrical property to identify a keystroke, said controller circuitry comprising circuitry for detecting a first voltage change responsive to said keycap being pressed down and circuitry for detecting a second voltage change responsive to a keycap returning to a normal state.

8. The electronic device of claim 7 wherein said keycap includes a flexible skirt.

9. The electronic device of claim 7 wherein said piezoelectric material layer changes resistance in response to a mechanical stress.

10. The electronic device of claim 7 wherein said piezoelectric material layer comprises a layer which changes resistance in response to a mechanical stress disposed between two plastic layers.

11. The electronic device of claim 7 wherein said keycap includes a flexible skirt.

12. The electronic device of claim 7 wherein said controller circuitry comprises:
   a plurality of row lines;
   a plurality of column lines;
   said keys each coupled to a row line and a column line; and
   detection circuitry for scanning said row and column lines for detecting a change in electrical property.

13. A portable computer comprising:
   a first housing containing a display;
   a second housing coupled to said first housing;
   a keyboard disposed in said second housing, said keyboard comprising:
   a plurality of keys, each comprising:
      a keycap,
      a material layer coupled to said keycap, said material layer forming a spring which exhibits changes in an electrical property in response to being deformed as the keycap moves from a normal position to a depressed position; and
   controller circuitry coupled to said keys for detecting a change in said electrical property to identify a keystroke, said keys being pushed to said depressed position when said first housing is closed against said second housing.

14. A portable commuter comprising:
   a first housing containing a display;
   a second housing coupled to said first housing;
   a keyboard disposed in said second housing, said keyboard comprising:
   a plurality of keys, each comprising:
      a keycap;
      a piezoelectric material layer forming one or more folded sidewall attached to said keycap, said piezoelectric material layer forming a sprint which exhibits changes in an electrical property in response to being deformed as the keycap moves from a normal position to a depressed position; and
   controller circuitry coupled to said keys for detecting a change in said electrical property to identify a keystroke.

15. The portable computer of claim 14 wherein said keycap includes a flexible skirt.

16. The portable computer of claim 14 wherein said piezoelectric material layer changes resistance in response to a mechanical stress.

17. The portable computer of claim 14 wherein said piezoelectric material layer is disposed between two plastic layers.

18. The portable computer of claim 14 wherein said material layer comprises a layer which changes resistance in response to a mechanical stress disposed between two plastic layers.

19. The portable computer of claim 14 wherein said controller circuitry comprises circuitry for detecting a first voltage change responsive to said keycap being pressed down and circuitry for detecting a second voltage change responsive to a keycap returning to a normal state.

20. The portable computer of claim 19 and further comprising circuitry for detecting an imbalance of voltages from said sidewalls of a key during a keystroke indicative of an off-center force applied to the key.

21. A portable computer comprising:

a first housing containing a display;

a second housing coupled to said first housing;

a keyboard disposed in said second housing, said keyboard comprising:

a plurality of keys, each comprising;

a keycap;

a material layer coupled to said keycap, said material layer forming a spring which exhibits changes in an electrical property in response to being deformed as the keycap moves from a normal position to a depressed position; and controller circuitry coupled to said keys for detecting a change in said electrical property to identify a keystroke, said controller circuitry comprising circuitry for detecting a first voltage change responsive to said keycap being pressed down and circuitry for detecting a second voltage change responsive to a keycap returning to a normal state.

22. The portable computer of claim 21 and further comprising circuitry for detecting an imbalance of voltages from said sidewalls of a key during a keystroke indicative of an off-center force applied to the key.

23. The portable computer of claim 21 wherein said keycap includes a flexible skirt.

24. The portable computer of claim 21 wherein said piezoelectric material layer changes resistance in response to a mechanical stress.

25. The portable computer of claim 21 wherein said piezoelectric material layer is disposed between two plastic layers.

26. The portable computer of claim 14 wherein said material layer comprises a layer which changes resistance in response to a mechanical stress disposed between two plastic layers.

* * * * *